(12) United States Patent
Chu

(10) Patent No.: US 9,170,690 B2
(45) Date of Patent: Oct. 27, 2015

(54) WATERPROOF HOUSING FOR DIGITAL DEVICES HAVING CAPACITIVE TOUCH SCREEN AND ITS ACTUATOR MECHANISM

(71) Applicant: Man Fong Chu, Hong Kong (HK)

(72) Inventor: Man Fong Chu, Hong Kong (HK)

( * ) Notice: Subject to any disclaimer, the term of this patent is extended or adjusted under 35 U.S.C. 154(b) by 262 days.

(21) Appl. No.: 13/632,144

(22) Filed: Sep. 30, 2012

(65) Prior Publication Data

US 2013/0082963 A1  Apr. 4, 2013

Related U.S. Application Data

(60) Provisional application No. 61/542,290, filed on Oct. 3, 2011.

(51) Int. Cl.
| | | |
|---|---|---|
| *G06F 3/041* | (2006.01) | |
| *G06F 3/044* | (2006.01) | |
| *G03B 17/08* | (2006.01) | |
| *G06F 1/16* | (2006.01) | |
| *H04M 1/18* | (2006.01) | |
| *A45C 13/00* | (2006.01) | |
| *A45C 11/00* | (2006.01) | |

(52) U.S. Cl.
CPC ............... *G06F 3/044* (2013.01); *G03B 17/08* (2013.01); *G06F 1/1628* (2013.01); *H04M 1/18* (2013.01); *A45C 13/008* (2013.01); *A45C 2011/002* (2013.01)

(58) Field of Classification Search
CPC .................................. G06F 3/041; G06F 1/16
See application file for complete search history.

(56) References Cited

U.S. PATENT DOCUMENTS

| 7,352,961 B2 † | 4/2008 | Watanabe | |
|---|---|---|---|
| 2007/0086273 A1* | 4/2007 | Polany et al. | 367/131 |
| 2009/0317069 A1 † | 12/2009 | Yim | |
| 2013/0082963 A1* | 4/2013 | Chu | 345/173 |
| 2013/0161163 A1* | 6/2013 | Nakamura et al. | 200/16 R |

FOREIGN PATENT DOCUMENTS

| CN | 101359156 A | 2/2009 |
|---|---|---|
| WO | 2011022759 | 3/2011 |

OTHER PUBLICATIONS

International Search Report issued for PCT Application No. PCT/CN2012/082352 by the International Search Authority.

\* cited by examiner
† cited by third party

*Primary Examiner* — Gregory J Tryder
*Assistant Examiner* — Sepideh Ghafari

(57) ABSTRACT

An actuator mechanism for actuating a capacitive touch screen of a digital device held in a waterproof housing includes an actuator shaft extending through an opening formed on the housing, a press button connected to an outer end of the shaft, a probe head connected to an inner end of the shaft, and a biasing member adapted to urge the probe head away from the touch screen, whereby pushing the press button against the biasing force moves the probe head towards and in contact with the touch screen. A waterproof housing having actuator mechanisms is also disclosed.

20 Claims, 9 Drawing Sheets

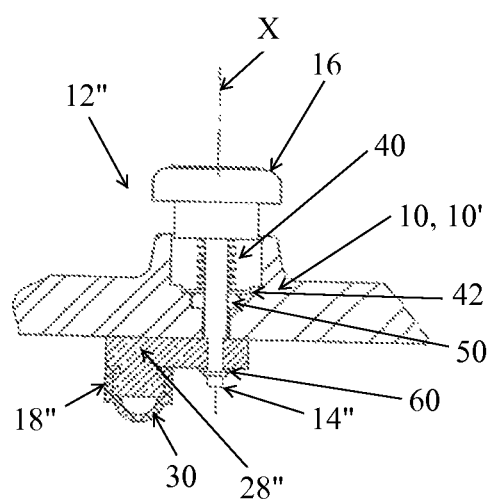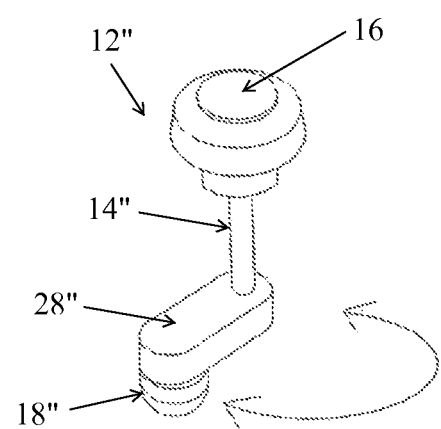
FIG. 9a
FIG. 9b

WATERPROOF HOUSING FOR DIGITAL DEVICES HAVING CAPACITIVE TOUCH SCREEN AND ITS ACTUATOR MECHANISM

CROSS-REFERENCE TO RELATED APPLICATIONS

This application claims priority of U.S. provisional patent application No. 61/542,290 filed on Oct. 3, 2011, the entire content of which is hereby incorporated by reference.

FIELD OF THE PATENT APPLICATION

The present patent application relates to a waterproof housing for digital devices, such as smart phones (e.g., iPhone), tablet computers (e.g., iPad) and digital cameras, having a capacitive touch screen. The present patent application also relates to an actuator mechanism for actuating a capacitive touch screen of a digital device held in a waterproof housing.

BACKGROUND

Many hand held digital devices, such as smart phones (e.g., iPhone), tablet computers (e.g., iPad) and digital cameras, are operated by touch screen input devices. A touch screen is normally a display screen which can identify the occurrence and position of a touch within a display region. The word "touch" usually refers to touch by a finger or body part of a user. It interacts with what is displayed on the screen rather than other input device, such as a keyboard, a mouse or a touch pad which interacts in an indirect way. There are many different types of touch screen available today. The most common types being used by hand held devices, such as smart phones, tablet computers and digital cameras are resistive and capacitive touch screens.

A resistive touch screen includes a glass sheet coated with a thin conductive layer and a metallic layer. The two layers are separated by a spacer. When a user makes contact with the touch screen, the two layers touch each other at the same location. The change in electric current will be identified and computed to a set of coordinates on the touch screen display. A resistive touch screen can be operated by fingers or by many types of object as long as it can provide pin point compression on the touch screen.

Another type of touch screen is capacitive touch screen. A capacitive touch screen includes a thin conductive layer such as Indium Tin Oxide, which is visually transparent. It stores electric charge and is positioned on a glass layer of the display. When a user makes contact with the touch screen, usually with a bare finger, small quantity of electric charge is transmitted to or from the user's finger. The quantity of electric charge on the touch screen at the designated position is reduced or increased. This change in electric charge is detected and computed to a set of coordinates on the display. A finger usually works well with capacitive touch screen. A human body is a good transferor and transferee of electric charge because of the electromagnetic field around the human body at all times. A device composed of compatible materials with good conductivity of electric charge can perform the function. However, a pencil or stylus which is workable on a resistive touch screen is not workable on a capacitive touch screen.

As previously mentioned, these touch screens can be used in many hand held digital devices. These digital devices may not be waterproof, and therefore cannot be used in wet or underwater environment. If a user wants to operate those devices in such environment, a waterproof case or housing would have to be used to encapsulate those digital devices in order to avoid water going into the digital devices and damaging the electronics, mechanical or optical components inside. These kinds of waterproof case can either be soft or hard. It usually has an opening allowing the user to load the digital device into the waterproof case. It usually has a locking mechanism for locking and sealing the waterproof case.

For soft waterproof cases, a user can control some of the features of the digital devices such as push buttons, rocker switches or levers from outside of the soft case by fingers. This type of soft case can also be used for devices with resistive touch screens. Some soft cases are compatible with devices having capacitive touch screens. This type of soft case can transfer electric charge to and fro between the human body and the capacitive touch screen in certain environment and conditions. In some situation, the inner surface of the soft waterproof case is in close contact with the capacitive touch screen due to, for example, insufficient air inside the case or the air inside the case is being compressed by water pressure when the waterproof case containing the digital device is immersed in water to a certain water depth.

Besides soft waterproof cases, there are hard waterproof housings for handheld digital devices. A hard waterproof housing can provide better protection to the digital devices against impact and it can go much deeper in water than soft waterproof cases because it can withstand water pressure to a certain depth without compressing the air inside the waterproof case. Due to its "hard" property, access from outside of the housing to the digital device inside the housing with a user's finger or body part without any mechanism is impossible.

Therefore, there is a need to provide a specially designed actuator mechanism for actuating a capacitive touch screen of a digital device inside a waterproof housing.

The above description of the background is provided to aid in understanding a waterproof housing and its actuator mechanism, but is not admitted to describe or constitute pertinent prior art to the waterproof housing and its actuator mechanism disclosed in the present application, or consider any cited documents as material to the patentability of the claims of the present application.

SUMMARY

According to one aspect of the present application, there is provided a waterproof housing for a digital device having a capacitive touch screen. The waterproof housing may include a housing body for holding therein the digital device, an actuator shaft extending through an opening formed on the housing body, a press button connected to an outer end of the shaft, a probe head connected to an inner end of the shaft, and a biasing member adapted to urge the probe head away from the touch screen, whereby pushing the press button against the biasing force of the biasing member moves the probe head towards and in contact with the touch screen. The press button, the shaft and the probe head may be made of a material capable of conducting electric charge.

According to one embodiment, the probe head may include a probe pad made of rubber for direct contact with the touch screen. The probe head may include a sleeve mounted on the inner end of the shaft, and the probe pad may be mounted on an enlarged free end of the sleeve.

The waterproof housing may further include an adaptor having a first end connected to the inner end of the shaft, and a second end connected to the probe head located at an off-center position relative to a center axis defined by the shaft. The adaptor may include a through hole for receiving therein the inner end of the shaft. The through hole of the adaptor and the inner end of the shaft received therein may have non-circular cross section, whereby the adaptor is rotatable about the center axis of the shaft, and the probe head is moveable along a circular path over the touch screen thereby carrying out a "touch-swipe" or a "touch-circle" motion across the touch screen.

The waterproof housing may further include a retaining ring fastened at the inner end of the shaft for retaining the adaptor at a position abutting against an inner surface of the housing body. The press button, the shaft, the adaptor and the probe head may be made of metal.

In one embodiment, the biasing member is a coil spring coiled around the outer end of the shaft between the press button and a washer seated in a circular recess formed on an outer surface of the housing body. The waterproof housing may further include an O-ring mounted on the shaft at the opening of the housing body for sealing a gap between the shaft and the opening.

According to another aspect of the present application, there is provided an actuator mechanism for actuating a capacitive touch screen of a digital device held in a waterproof housing. The actuator mechanism may include an actuator shaft extending through an opening formed on the housing, a press button connected to an outer end of the shaft, a probe head connected to an inner end of the shaft, and a biasing member adapted to urge the probe head away from the touch screen, whereby pushing the press button against the biasing force of the biasing member moves the probe head towards and in contact with the touch screen. The press button, the shaft and the probe head may be made of a material capable of conducting electric charge.

In one embodiment, the probe head may include a probe pad made of rubber for direct contact with the touch screen. The probe head may include a sleeve mounted on the inner end of the shaft, and the probe pad can be mounted on an enlarged free end of the sleeve.

The actuator mechanism may further include an adaptor having a first end connected to the inner end of the shaft, and a second end connected to the probe head located at an off-center position relative to a center axis defined by the shaft. The adaptor may include a through hole for receiving therein the inner end of the shaft. The through hole of the adaptor and the inner end of the shaft received therein may have non-circular cross section, whereby the adaptor is rotatable about the center axis of the shaft, and the probe head is moveable along a circular path over the touch screen thereby carrying out a "touch-swipe" or a "touch-circle" motion across the touch screen.

The actuator mechanism may further include a retaining ring fastened at the inner end of the shaft for retaining the adaptor at a position abutting against an inner surface of the housing. The press button, the shaft, the adaptor and the probe head may be made of metal.

In one embodiment, the biasing member may be a coil spring coiled around the outer end of the shaft between the press button and a washer seated in a circular recess formed on an outer surface of the housing. The actuator mechanism may further include an O-ring mounted on the shaft at the opening of the housing for sealing a gap between the shaft and the opening.

Although the waterproof housing and its actuator mechanism disclosed in the present application are shown and described with respect to certain embodiments, it is obvious that equivalents and modifications will occur to others skilled in the art upon the reading and understanding of the specification. The present application includes all such equivalents and modifications, and is limited only by the scope of the claims.

BRIEF DESCRIPTION OF THE DRAWINGS

Specific embodiments of the waterproof housing and its actuator mechanism disclosed in the present application will now be described by way of example with reference to the accompanying drawings wherein:

FIG. 7b shows the downward movement of the actuator mechanism in FIG. 7a;

FIG. 8 is an exploded view of the actuator mechanism in FIG. 7a;

FIG. 9a is a cross sectional view of the actuator mechanism according to a third embodiment of the present application;

FIG. 9b shows the downward/swiping movement of the actuator mechanism in FIG. 9a; and FIG. 10 is an exploded view of the actuator mechanism in FIG. 9a.

DETAILED DESCRIPTION

Reference will now be made in detail to a preferred embodiment of the waterproof housing and its actuator mechanism disclosed in the present application, examples of which are also provided in the following description. Exemplary embodiments of the waterproof housing and its actuator mechanism disclosed in the present application are described in detail, although it will be apparent to those skilled in the relevant art that some features that are not particularly important to an understanding of the waterproof housing and its actuator mechanism may not be shown for the sake of clarity.

Furthermore, it should be understood that the waterproof housing and its actuator mechanism disclosed in the present application are not limited to the precise embodiments described below and that various changes and modifications thereof may be effected by one skilled in the art without departing from the spirit or scope of the appended claims. For example, elements and/or features of different illustrative embodiments may be combined with each other and/or substituted for each other within the scope of this disclosure and appended claims.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element, or is in mechanical or electrical communication with another element.

Figure 1:
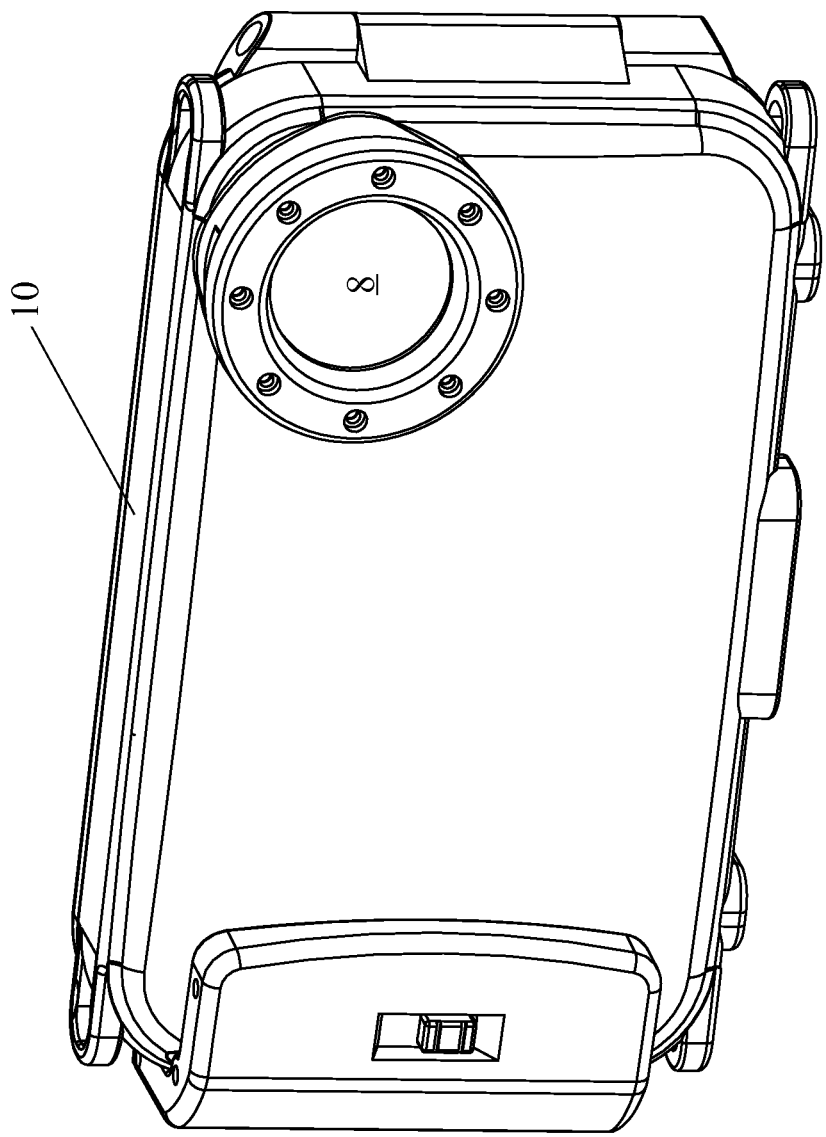
FIG. 1 is a front perspective view of a waterproof housing for holding therein a smart phone according to an embodiment of the present application.
Figure 2:
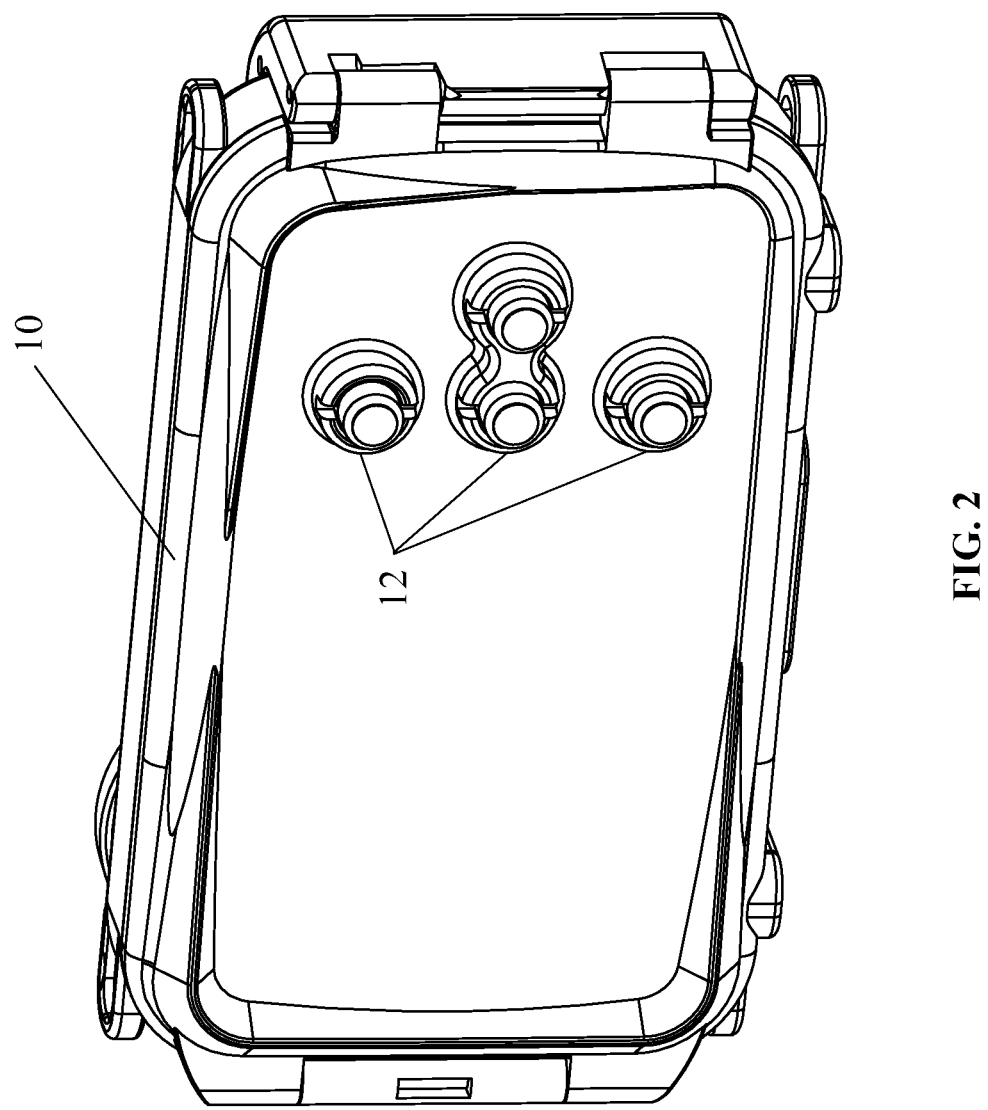
FIG. 2 is a back perspective view (showing actuator mechanisms) of a waterproof housing for holding therein a smart phone according to an embodiment of the present application.

FIG. 1 is a front perspective view of a waterproof housing 10 for holding therein a smart phone according to an embodiment of the present application. When the smart phone is held in the waterproof housing 10, the lens of the camera of the smart phone is positioned at the back of the transparent glass 8. The camera can therefore take photos or videos under the water. FIG. 2 is a back perspective view of a waterproof housing 10 for holding therein a smart phone according to an embodiment of the present application. In this embodiment, actuator mechanisms 12 are provided at the back of the waterproof housing 10 and are capable of actuating the capacitive touch screen of the smart phone inside the waterproof housing 10. The camera can therefore be controlled via the actuator mechanisms 12.

As will be depicted in FIGS. 3-10, actuator mechanisms 12, 12', 12" may be provided on the housing 10 at one side thereof where the capacitive touch screen is facing. The actuator mechanisms 12, 12', 12" are adapted to actuate the capacitive touch screen inside the housing 10. Details of the actuator mechanisms 12, 12', 12" will be described later. It is understood that the waterproof housing 10 can be sized and shaped to hold therein different digital devices of different shapes and models (such as smart phone, tablet computers, digital cameras, etc.). The waterproof housing 10 may be made of a transparent material so that movement of the actuator mechanisms 12, 12', 12" can be observed and the touch screen can be viewed by a user from the outside of the housing 10.

Figure 3:
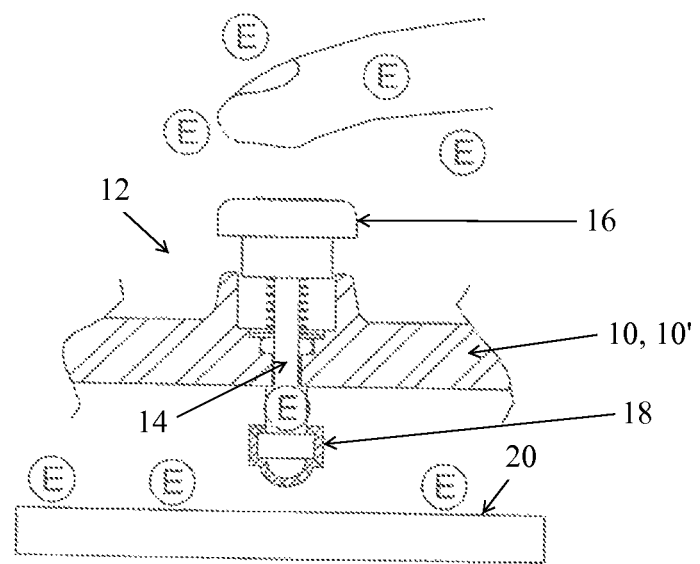
FIG. 3 is an illustrative diagram showing an actuator mechanism at a rest position.

FIG. 3 shows the actuator mechanism 12 at a rest position. The actuator mechanism 12 may include an actuator shaft 14, a press button 16 and a probe head 18. At this rest position, the probe head 18 is not touching the capacitive touch screen 20.

Figure 4:
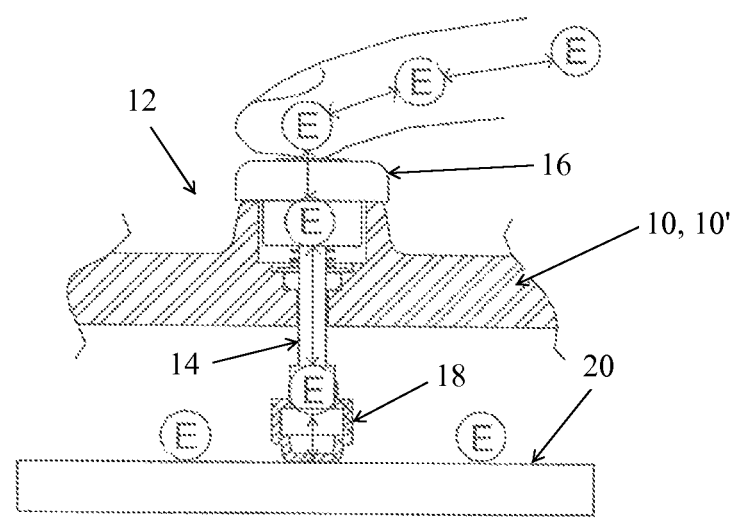
FIG. 4 is an illustrative diagram showing the actuator mechanism at an actuation position when the press button is pushed.

FIG. 4 shows the actuator mechanism 12 at an actuation position when the press button 16 is pushed downwards/inwards by a finger of a user, and the probe head 18 is touching the capacitive touch screen 20. At this actuation position, electric charge E can be transferred between the finger of the user and the capacitive touch screen 20 through the press button 16, the actuator shaft 14 and the probe head 18, as shown by the arrows.

Figure 5:
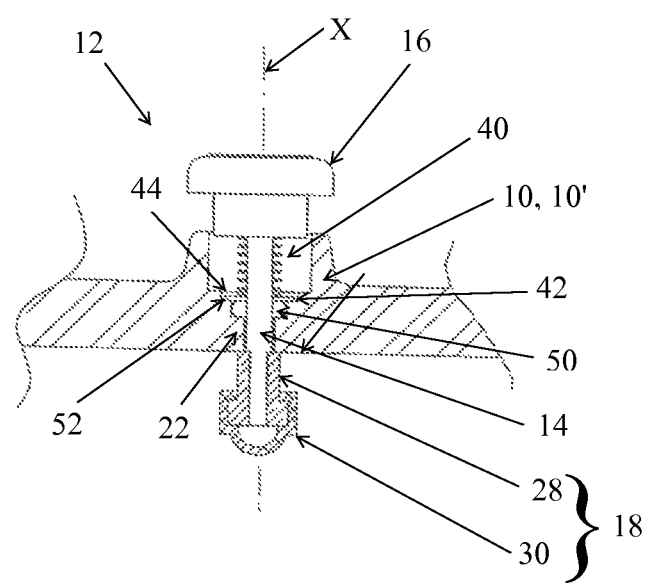
FIG. 5 is a cross sectional view of an actuator mechanism according to a first embodiment of the present application.
Figure 6:
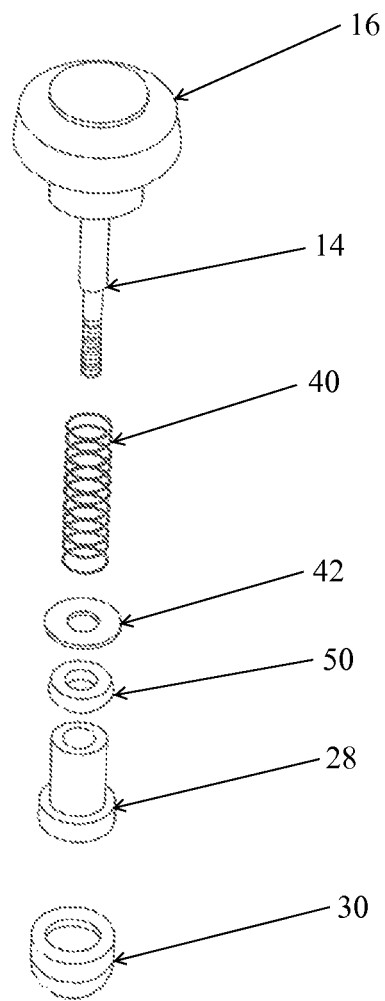
FIG. 6 is an exploded view of the actuator mechanism in FIG. 5.

FIGS. 5 and 6 show the actuator mechanism 12 according to the first embodiment of the present application. The actuator shaft 14 of the actuator mechanism 12 may extend through an opening 22 formed on the body of the housing 10 and define a center axis X. The actuator shaft 14 can have a diameter slightly less than the diameter of the opening 22 so that the actuator shaft 14 can move smoothly inwards or outwards through the opening 22. The actuator shaft 14 can have an outer end and an inner end. The actuator shaft 14 can be long enough to allow the outer end of the actuator shaft 14 to extend outwardly from the housing 10, and allow the inner end of the actuator shaft 14 to extend inwardly into the housing 10. The actuator shaft 14 may be made of metal, a metalized material or a material capable of conducting electric charge.

The press button 16 may be connected to the outer end of the actuator shaft 14. The press button 16 can be the top part of the actuator mechanism 12. The press button 16 may be in the shape of a mushroom or a flat head such that it is comfortable for a user to press with a finger or a hand. The press button 16 may be made of metal, a metalized material or a material capable of conducting electric charge. In addition, a thin layer of non-metal coating can be applied. This type of surface finishing can yield good contact with a user's finger or hand allowing electric charge on the touch screen 20 of the digital device to transfer to or from the finger or hand of the user.

A biasing member 40 can be used to urge the probe head 18 away from the touch screen 20. When the press button 16 is pushed against the biasing force, it can move the probe head 18 towards and in contact with the touch screen 20.

According to the illustrated embodiment, the biasing member 40 is a coil spring coiled around the outer end of the actuator shaft 14 between the press button 16 and a washer 42 seated in a circular recess 44 formed on an outer surface of the housing 10. The biasing member 40 provides a biasing force to urge the press button 16 to its highest position, which is the initial position when the press button 16 is not pressed by a user. The biasing member 40 can also urge and hold the washer 42 inside the circular recess 44. The washer 42 may be made of metal or plastic.

Although a coil spring has been shown, it is understood by one skilled in the art that any other suitable type of biasing member, such as a leaf spring, may be used.

An O-ring 50 may be mounted on the actuator shaft 14 at the opening 22 of the waterproof housing 10 for sealing the gap between the actuator shaft 14 and the opening 22. The O-ring 50 can be disposed underneath the washer 42 and seated inside a circular recess 52. The O-ring 50 may be made of elastic material such as rubber or synthetic rubber. The O-ring 50 may have an inner diameter slightly smaller than the diameter of the actuator shaft 14 so that the O-ring 50 can tightly fit around the actuator shaft 14. Furthermore, the diameter of the circular recess 52 may be slightly smaller than the outer diameter of the O-ring 50 so that the O-ring 50 can be tightly fitted inside the circular recess 52. Because of the application of the O-ring 50, the actuator shaft 14 can move outwards and inwards while maintaining the housing 10 in a tightly sealed condition. In addition, a water-sealing compound can be applied in between the O-ring 50, the circular recess 52 and the actuator shaft 14 to enhance the water-sealing performance while lubricating the actuator shaft 14 and smoothing its movement, and minimizing the friction created by the O-ring 50.

According to the illustrated embodiment in FIGS. 5 and 6, the probe head 18 may include an adaptor in the form of a sleeve 28 and a probe pad 30 for direct contact with the touch screen 20. The sleeve 28 may be mounted on the inner end of the actuator shaft 14 and the probe pad 30 can be mounted on an enlarged free end of the sleeve 28. The sleeve 28 may be formed with internal threads for threadedly engaging complementary external threads formed on the inner end of the actuator shaft 14.

The probe pad 30 may be made of soft material such as rubber. Additive may be added to the rubber in order to enhance its electric charge transfer performance. Soft material is used because it can minimize possible scratch or damage on the touch screen 20.

Figure 7A:
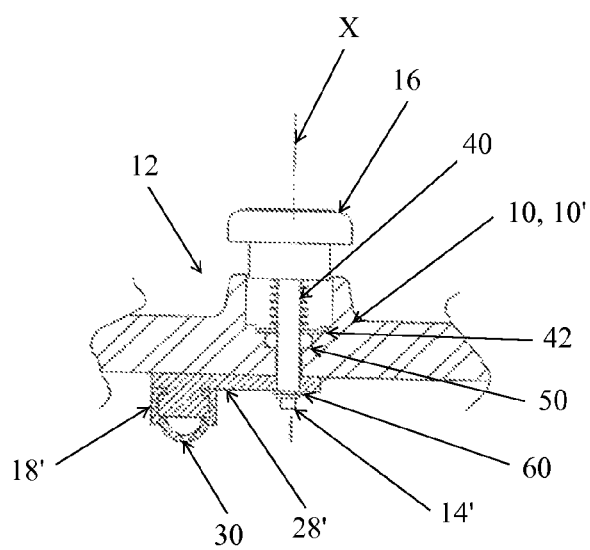
FIG. 7a is a cross sectional view of the actuator mechanism according to a second embodiment of the present application.
Figure 7B:
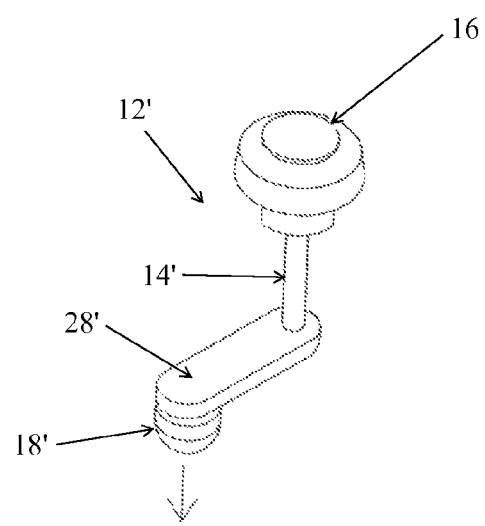
Figure 8:
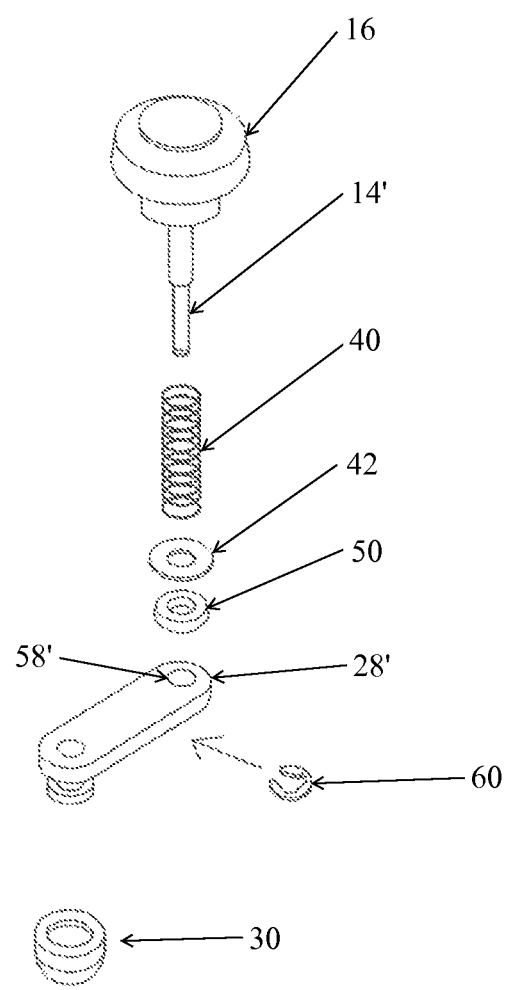

FIGS. 7a, 7b and 8 show the second embodiment of the actuator mechanism 12 of the waterproof housing 10. According to this embodiment, the actuator mechanism 12' may include an adaptor 28'. The adaptor 28' can be formed with a through hole 58' through which the inner end of a modified actuator shaft 14' can pass. The diameter of the through hole 58' can be the same as the diameter of the inner end of the actuator shaft 14' so that the inner end of the actuator shaft 14' can be tightly fitted in the through hole 58'.

The adaptor 28' may be in the form of an arm having a first end connected to the inner end of the actuator shaft 14' and a second end connected to a probe head 18' disposed at an off-center position away from the center axis X of the actuator shaft 14'. The probe pad 30 can be mounted on the probe head 18'. A retaining C-ring or E-ring 60, or other type of fastener may be used to hold the adaptor 28' at a position abutting against an inner surface of the housing 10.

The adaptor 28' may be made of metal, a metalized material or a material capable of conducting electric charge. The adaptor 28' may have a comparatively larger flat surface or mushroom shape head in order to improve the electric charge transfer to or from the touch screen 20.

At an initial state, as illustrated in FIG. 3, the press button 16 is at its highest position when the press button 16 is released and the biasing member 40 is urging the press button 16 upwards. The biasing member 40 pushes the washer 42 downwards thereby holding the O-ring 50 inside the circular recess 52 formed on waterproof housing 10. Since the press button 16 is at its highest position, the probe head 18 being connected to the shaft 14 is also at its highest position. Therefore, the probe head 18 is not touching the capacitive touch screen 20 of the digital device inside the waterproof housing 10. The electric charge E on the capacitive touch screen 20 does not change.

When a user's finger or body part starts to touch the press button 16 and begins to press downwards, the user's finger or body part gets intimate with the press button 16 and the contact area with the press button 16 increases. Since the press button 16 is metal or metalized, the user's finger or body part is electric charge connected.

When the user's finger or body part continues to press downwards, the electric charge conductivity between the press button 16 and the user's finger or body part further improves. The press button 16 together with the actuator shaft 14 starts to move downwards. The biasing member 40 supporting the press button 16 is compressed. Since an O-ring 50 is installed on the actuator shaft 14 with a water-sealing compound, it can prevent water outside the waterproof housing 10, 10 from entering into the waterproof housing 10, 10 and damaging the digital device held therein. The probe head 18 carried by the actuator shaft 14 starts touching the touch screen 20. When the probe pad 30 is further pressed onto the touch screen 20, the probe pad 30 starts to deform and form a larger contact area with the touch screen 20, as depicted in FIG. 4, thereby enhancing the electric charge conductivity. Through the large flat or mushroom-shaped surface of the press button 16, the actuator shaft 14 and the probe head 18, it starts to transfer or receive electric charge to or from human body. This results in change of electric charge on the touch screen 20. The digital device can then compute a set of coordinates on the touch screen display.

When the press button 16 is released, the biasing member 40 then pushes the press button 16 upwards. The actuator shaft 14 and the probe head 18 also move upwards thereby separating the probe head 18 from the touch screen 20 and stopping the interaction with the touch screen 20. The operation of the actuator mechanism 12 is then completed.

In some situation when the designated location of the press button 16 does not match with the sensing location of the touch screen 20 due to design limitations, then the probe head 18 may need to be mounted at an off-center position away from the center axis X of the actuator shaft 14. Therefore, another embodiment with modification from the previous embodiment is required.

FIGS. 7a, 7b and 8 show the actuator mechanism 12' according to another embodiment of the present application. In this embodiment, the actuator mechanism 12 may include an adaptor in the form of an extension arm 28'. The extension arm 28' may be made of metal or other charge conductive material. One end of the extension arm 28' may be attached to the modified actuator shaft 14' by means of the E-ring 60 or other suitable fastening techniques. The E-ring 60 can be used to retain the extension arm 28' at a position abutting an inner surface of the waterproof housing 10. At the other end of the extension arm 28', a probe head 18' with a similar design as the previous embodiment may be provided.

In order to prevent the extension arm 28' from swinging or rotating about the actuator shaft 14 which may result in the probe head 18 probing at the wrong location on the touch screen 20, one or more posts or guides (not shown) may be provided along the sides of the extension arm 28'. This allows the probe head 18' to moves only vertically up or down, as illustrated in FIG. 7b. The press button 16, the actuator shaft 14', the extension arm 28' and the probe head 18' form a complete electric charge conducting path. When a user presses the press button 16, the probe head 18' moves downwards together with the press button 16, the actuator shaft 14' and the extension arm 28'. The probe head 18' then comes into contact with the touch screen 20. This results in a change of electric charge on the touch screen 20. The digital device is then able to detect the occurrence of the touch and compute a set of coordinates on the touch screen display.

In some situation when the touch screen 20 of the digital device requires "touch-swipe" or "touch-circle" motion rather than just a "touch" motion at a designated location, the probe head 18' may need to move in a swiping or circular motion after it touches the touch screen 20. A further embodiment with modification from the previous embodiment is required.

Figure 10:
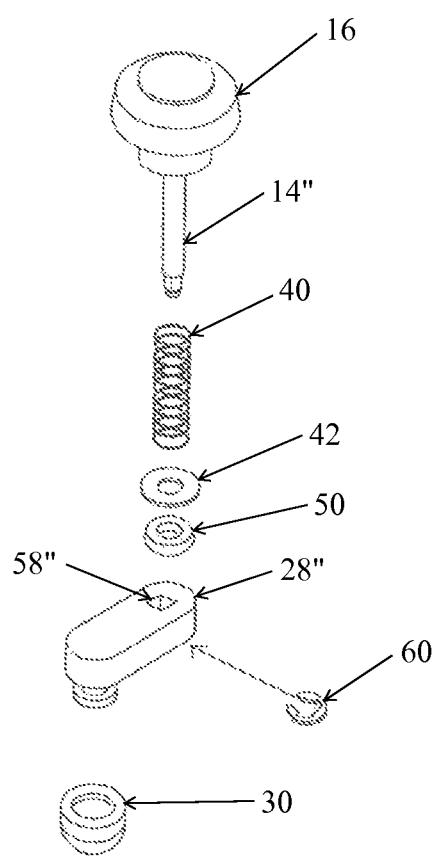

FIGS. 9a, 9b and 10 show the actuator mechanism 12" according to another embodiment of the present invention. In this embodiment, the inner end of the actuator shaft 14" is formed into a non-circular shape, such as rectangular shape. It matches to an adaptor 28" with a through hole 58" of the same shape. The adaptor 28" has one end connected to the actuator shaft 14" and another end incorporated with a probe head 18". Similarly, retaining ring such as an E-ring 60 or other fastening techniques may be used to retain the adaptor 28" at a position abutting an inner surface of the waterproof housing 10. The press button 16, the actuator shaft 14", the adapter 28" and the probe head 18" form a complete electric charge conducting path.

When a user presses the press button 16, the probe head 18" moves downwards together with the press button 16, the actuator shaft 14" and the adaptor 28". The probe head 18" moves towards and then comes into contact with the touch screen 20. This results in a change in electric charge on the touch screen 20. The digital device is then able to detect the occurrence of the touch and compute a set of coordinates on the touch screen display. When a user turns the press button 16 while pressing the press button 16, the actuator shaft 14" rotates about the center axis X of the actuator shaft 14". The probe head 18" of the adaptor 28" can move along a circular path around the actuator shaft 14" while the probe head 18" is touching the touch screen 20, as depicted in FIG. 9b. The touch screen 20 can then detect the change in electric charge along the path and compute new sets of coordinates on the touch screen display. Therefore, the actuator mechanism 12" of the present embodiment can perform a "touch-swipe" or a "touch-circle" motion so as to activate a function on the touch screen 20.

While the waterproof housing and its actuator mechanism disclosed in the present application have been shown and described with particular references to a number of preferred embodiments thereof, it should be noted that various other changes or modifications may be made without departing from the scope of the appending claims.

What is claimed is:

1. A waterproof housing for a digital device having a capacitive touch screen, the waterproof housing comprising:
    a housing body for holding therein the digital device;
    an actuator shaft extending through an opening formed on the housing body;
    a press button connected to an outer end of the shaft;
    a probe head connected to an inner end of the shaft;
    a biasing spring adapted to urge the probe head away from the touch screen, wherein pushing the press button against a spring force of the biasing spring moves the probe head towards and in contact with the touch screen; and
    a biasing deformable dome-shaped pad mounted on the probe head facing the touch screen, and adapted to come into contact with and deform into a generally flat surface urging against the touch screen when the press button is further pushed against the spring force of the biasing spring and a biasing force of the biasing deformable dome-shaped probe pad;
    wherein the press button, the shaft, the probe head and the probe pad are made of materials capable of conducting electric charge; and wherein when a contact area between the probe pad and the touch screen becomes large enough, electric charge passes through the press button, the shaft, the probe head and the probe pad to the touch screen.

2. The waterproof housing as claimed in claim 1, wherein the probe head comprises a sleeve mounted on the inner end of the shaft, and the probe pad is mounted on an enlarged free end of the sleeve.

3. The waterproof housing as claimed in claim 1, further comprising an adaptor having a first end connected to the inner end of the shaft, and a second end connected to the probe head located at an off-center position relative to a center axis defined by the shaft.

4. The waterproof housing as claimed in claim 3, wherein the adaptor comprises a through hole for receiving therein the inner end of the shaft.

5. The waterproof housing as claimed in claim 4, wherein the through hole of the adaptor and the inner end of the shaft received therein have non-circular cross section, whereby the adaptor is rotatable about the center axis of the shaft, and the probe head is moveable along a circular path over the touch screen thereby carrying out a "touch-swipe" or a "touch-circle" motion across the touch screen.

6. The waterproof housing as claimed in claim 3, further comprising a retaining ring fastened at the inner end of the shaft for retaining the adaptor at a position abutting against an inner surface of the housing body.

7. The waterproof housing as claimed in claim 3, wherein the press button, the shaft, the adaptor and the probe head are made of metal.

8. The waterproof housing as claimed in claim 1, wherein the biasing spring is a coil spring coiled around the outer end of the shaft between the press button and a washer seated in a circular recess formed on an outer surface of the housing body.

9. The waterproof housing as claimed in claim 1, further comprising an O-ring mounted on the shaft at the opening of the housing body for sealing a gap between the shaft and the opening.

10. An actuator mechanism for actuating a capacitive touch screen of a digital device held in a waterproof housing, the actuator mechanism comprising:
    an actuator shaft extending through an opening formed on the housing;
    a press button connected to an outer end of the shaft;
    a probe head connected to an inner end of the shaft;
    a biasing spring adapted to urge the probe head away from the touch screen, wherein pushing the press button against a biasing force of the biasing spring moves the probe head towards and in contact with the touch screen; and
    a biasing deformable dome-shaped probe pad mounted on the probe head facing the touch screen, and adapted to come into contact with and deform into a generally flat surface urging against the touch screen when the press button is further pushed against the spring force of the biasing spring and a biasing force of the biasing deformable dome-shaped probe pad;
    wherein the press button, the shaft, the probe head and the probe pad are made of materials capable of conducting electric charge; and wherein when a contact area between the probe pad and the touch screen becomes large enough, electric charge passes through the press button, the shaft, the probe head and the probe pad to the touch screen.

11. The actuator mechanism as claimed in claim 10, wherein the probe head comprises a sleeve mounted on the inner end of the shaft, and the probe pad is mounted on an enlarged free end of the sleeve.

12. The actuator mechanism as claimed in claim 10, further comprising an adaptor having a first end connected to the inner end of the shaft, and a second end connected to the probe head located at an off-center position relative to a center axis defined by the shaft.

13. The actuator mechanism as claimed in claim 12, wherein the adaptor comprises a through hole for receiving therein the inner end of the shaft.

14. The actuator mechanism as claimed in claim 13, wherein the through hole of the adaptor and the inner end of the shaft received therein have non-circular cross section, wherein the adaptor is rotatable about the center axis of the shaft, and the probe head is moveable along a circular path over the touch screen thereby carrying out a "touch-swipe" or a "touch-circle" motion across the touch screen.

15. The actuator mechanism as claimed in claim 12, further comprising a retaining ring fastened at the inner end of the shaft for retaining the adaptor at a position abutting against an inner surface of the housing.

16. The actuator mechanism as claimed in claim 12, wherein the press button, the shaft, the adaptor and the probe head are made of metal.

17. The actuator mechanism as claimed in claim 10, wherein the biasing spring is a coil spring coiled around the outer end of the shaft between the press button and a washer seated in a circular recess formed on an outer surface of the housing.

18. The actuator mechanism as claimed in claim 10, further comprising an O-ring mounted on the shaft at the opening of the housing for sealing a gap between the shaft and the opening.

19. A method for actuating a capacitive touch screen of a digital device held in a waterproof housing, the method comprising the steps of;
    providing an actuator mechanism comprising an actuator shaft extending through an opening formed on the housing, a press button connected to an outer end of the shaft, a probe head connected to an inner end of the shaft, a biasing spring adapted to urge the probe head away from the touch screen, and a biasing deformable dome-shaped probe pad mounted on the probe head facing the touch screen, wherein the press button, the shaft, the probe head and the probe pad are made of materials capable of conducting electric charge;

pushing the press button against a spring force of the biasing spring to thereby move the probe head towards the touch screen; and further pushing the press button against the spring force of the biasing spring and a biasing force of the biasing deformable dome-shaped probe pad so that the dome-shaped probe pad comes into contact with and deforms into a generally flat surface urging against the touch screen, wherein when contact area between the probe pad and the touch screen becomes large enough, electric charge passes through the press button, the shaft the probe head and the probe pad to the touch screen.

20. The method as claimed in claim 19, further comprising the step of rotating the press button to thereby carry out a "touch-swipe" or a "touch-circle" motion across the touch screen.

* * * * *